Jan. 26, 1926. 1,570,841
W. KARNATZ
FLOWER BOX
Filed March 23, 1925
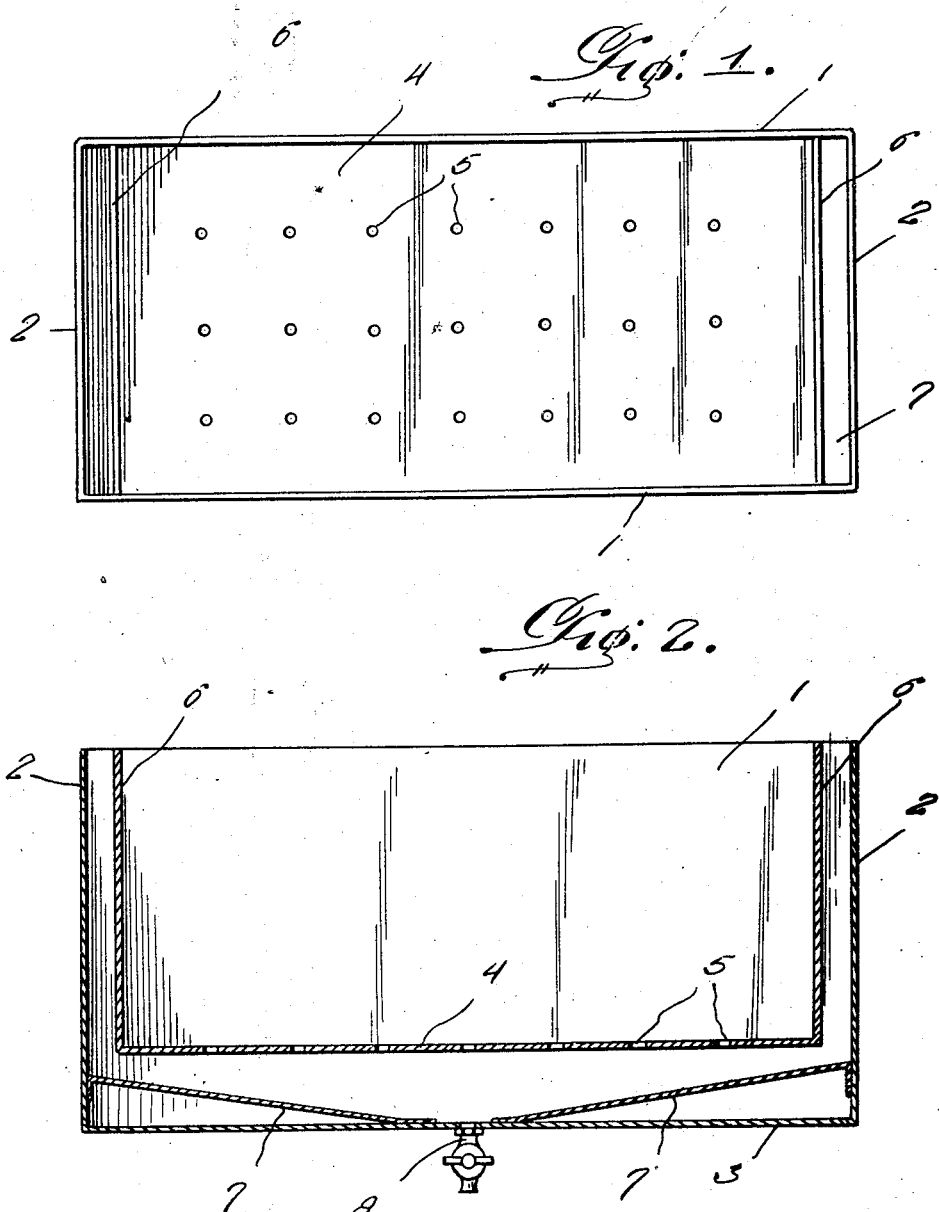
Inventor
W. Karnatz,
By
Attorney Patented Jan. 26, 1926.

1,570,841

UNITED STATES PATENT OFFICE.

WILLIAM KARNATZ, OF BISMARCK, NORTH DAKOTA.

FLOWER BOX.

Application filed March 23, 1925. Serial No. 17,752.

*To all whom it may concern:*

Be it known that I, WILLIAM KARNATZ, a citizen of the United States, residing at Bismarck, in the county of Burleigh and State of North Dakota, have invented certain new and useful Improvements in Flower Boxes, of which the following is a specification.

This invention relates to an improved flower box, such as is particularly adapted for disposition in house windows, upon porches and the like.

More specifically, the invention has reference to a flower box of comparative simplicity and durability, which is constructed for permitting a free circulation of air therethrough, and to permit proper drainage of excess water therefrom, whereby to facilitate and enhance the growth of plants.

The specific structure and the advantages and features derived from its use will become clearly apparent from the following description and drawings.

In the accompanying drawings, forming a part of this application, and in which like numerals are employed to designate like parts throughout the same:

Figure 1 is a top plan view of a flower box constructed in accordance with the present invention.

Figure 2 is a central vertical longitudinal section through the same.

In the drawing, the box proper is made up of opposed side and end walls 1 and 2 respectively, and a bottom 3. The box is open at its top. Disposed within the box and terminating in spaced relation from the end walls and supported from the side walls is a false bottom 4 provided with a multiplicity of apertures 5. Connected to the opposite ends of this false bottom and extending vertically in spaced relation to the end walls 2 are partitions 6. With this construction, I virtually provide inner and outer boxes, the inner one of which is adapted to contain the soil and plants and the outer one of which provides an air circulating passage thereabout. The false bottom 4 is spaced a considerable distance above the main bottom 3, and inclined plates 7 are disposed in this space, these plates constituting chutes for casting drain water downwardly to the center of the bottom, to be discharged through the valve 8.

In practice, the inner box is filled with the soil and plants in the customary manner, and by the presence of the apertures in the false bottom, air and water are permitted to effectively permeate the soil. Excess water which would otherwise collect in the bottom of the box and contaminate the lower strata of soil is permitted to drain through the apertures and is carried downwardly on the chute and permitted to collect in the bottom of the main box to be drained therefrom through the valve, whenever desired. A thorough circulation of air is permitted between the false bottom and main bottom and the partition 6 and end wall 2.

It is thought that the foregoing description taken in connection with the drawing, will enable persons skilled in the art to which the invention relates to obtain clear understanding of the same. Therefore, a more lengthy description is deemed unnecessary.

Minor changes in the shape and size within the field of invention claimed may be resorted to, if desired.

I claim:

A flower box comprising opposed side and end walls and bottom walls, said bottom wall being provided with a centrally located valve, a false bottom connected to the side walls and spaced from the end walls and equipped with a multiplicity of apertures, partitions connected with said false bottom and side walls of the box and spaced from the end walls, said false bottom being spaced above the bottom of the main box, and inclined chutes connected to the end walls of the box and inclining toward the bottom of the main box so as to guide drain water toward said valve.

In testimony whereof I affix my signature.

WILLIAM KARNATZ.